(12) United States Patent
Dervaux et al.

(10) Patent No.: US 10,550,728 B2
(45) Date of Patent: Feb. 4, 2020

(54) ASSEMBLY FOR THE REMOVAL, TRANSPORTATION, AND MAINTENANCE OF A TURBINE ENGINE

(71) Applicant: Safran Aircraft Engines, Paris (FR)

(72) Inventors: Alexandre Dervaux, Tournan en Brie (FR); Yves Roland Crochemore, Palaiseau (FR); Franck Dubreucq, Avon (FR); Thibaud Mangin, Boussy Saint Antoine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 108 days.

(21) Appl. No.: 15/821,631

(22) Filed: Nov. 22, 2017

(65) Prior Publication Data

US 2018/0142576 A1 May 24, 2018

(30) Foreign Application Priority Data

Nov. 24, 2016 (FR) ...................................... 1661457

(51) Int. Cl.
*F01D 25/28* (2006.01)
*B64F 5/50* (2017.01)

(52) U.S. Cl.
CPC .............. *F01D 25/285* (2013.01); *B64F 5/50* (2017.01); *F05D 2260/02* (2013.01);
(Continued)

(58) Field of Classification Search
CPC ............. F05D 2230/68; F05B 2230/61; Y10T 29/4932; Y10T 29/53961; Y10T 29/53991
See application file for complete search history.

(56) References Cited

U.S. PATENT DOCUMENTS 2,825,477 A  3/1958  Ross
3,432,911 A *  3/1969  Rodgers .................... B64F 5/50
                                                      29/464

(Continued)

FOREIGN PATENT DOCUMENTS

FR       1526221       5/1968
FR       2990190       11/2013
WO    WO-2011061306    5/2011

OTHER PUBLICATIONS

French Search Report, dated Jul. 11, 2017, French Application No. FR1661457.

*Primary Examiner* — Jason L Vaughan
(74) *Attorney, Agent, or Firm* — Womble Bond Dickinson (US) LLP

(57) ABSTRACT

The invention relates to an assembly for the removal, transportation and maintenance of an aircraft turbine engine (10) on a maintenance trolley (34), comprising a turbine engine (10) comprising an upper means (14) for attaching the housing (16) of the turbine engine (10) to the aircraft and a first lower means (20) dedicated to transportation for attaching the housing (16) of the turbine engine (10), a maintenance trolley (34), and a member (32) comprising a means for attaching said member (34) to the housing (16) and at least one means for support and articulation of said member (32) and of the turbine engine (10) on the trolley (34), allowing the turbine engine (10) to pivot to the vertical; characterised in that the member comprises a first attachment means designed to engage with the upper means (14), a second attachment means designed to engage with the first lower means (20), and a pivot means forming the support and articulation means engaging with a complementary receiving means (44) of the trolley (34).

11 Claims, 4 Drawing Sheets

(52) U.S. Cl.
CPC ...... *Y10T 29/4932* (2015.01); *Y10T 29/53961* (2015.01); *Y10T 29/53991* (2015.01)

(56) References Cited

U.S. PATENT DOCUMENTS

| | | | | |
|---|---|---|---|---|
| 4,044,442 | A | * | 8/1977 | Carlson ................ F01D 25/285 29/888.012 |
| 4,451,979 | A | * | 6/1984 | Schuster ............... F01D 25/285 29/281.4 |
| 5,971,702 | A | * | 10/1999 | Afton .................... B23P 19/022 29/888.011 |
| 7,770,292 | B2 | * | 8/2010 | Stretton .................. B66C 1/10 269/17 |
| 9,738,391 | B2 | * | 8/2017 | Mercier ................ F01D 25/285 |
| 2008/0003093 | A1 | * | 1/2008 | Brown ..................... F02C 7/20 415/1 |
| 2008/0011932 | A1 | * | 1/2008 | Stretton ................... B66C 1/10 248/544 |
| 2014/0259663 | A1 | * | 9/2014 | Scelsi ................... B25H 1/0007 29/888.01 |
| 2015/0316197 | A1 | | 11/2015 | Morey et al. |

* cited by examiner

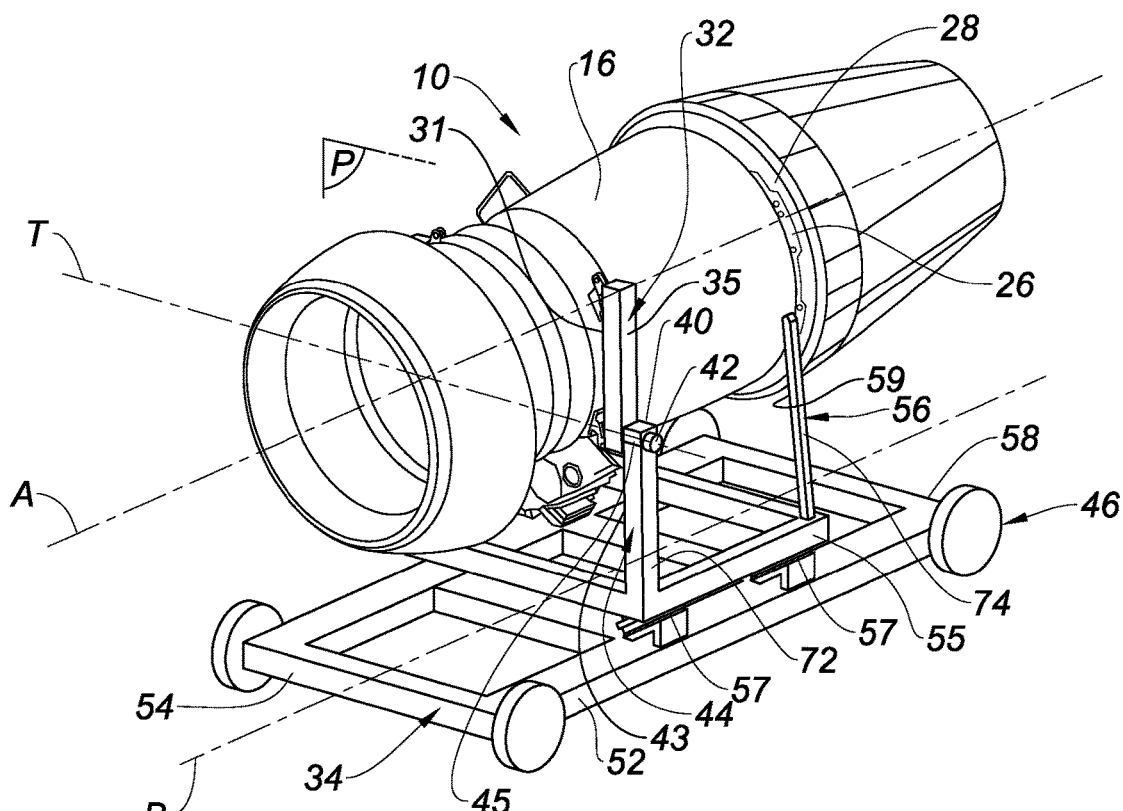
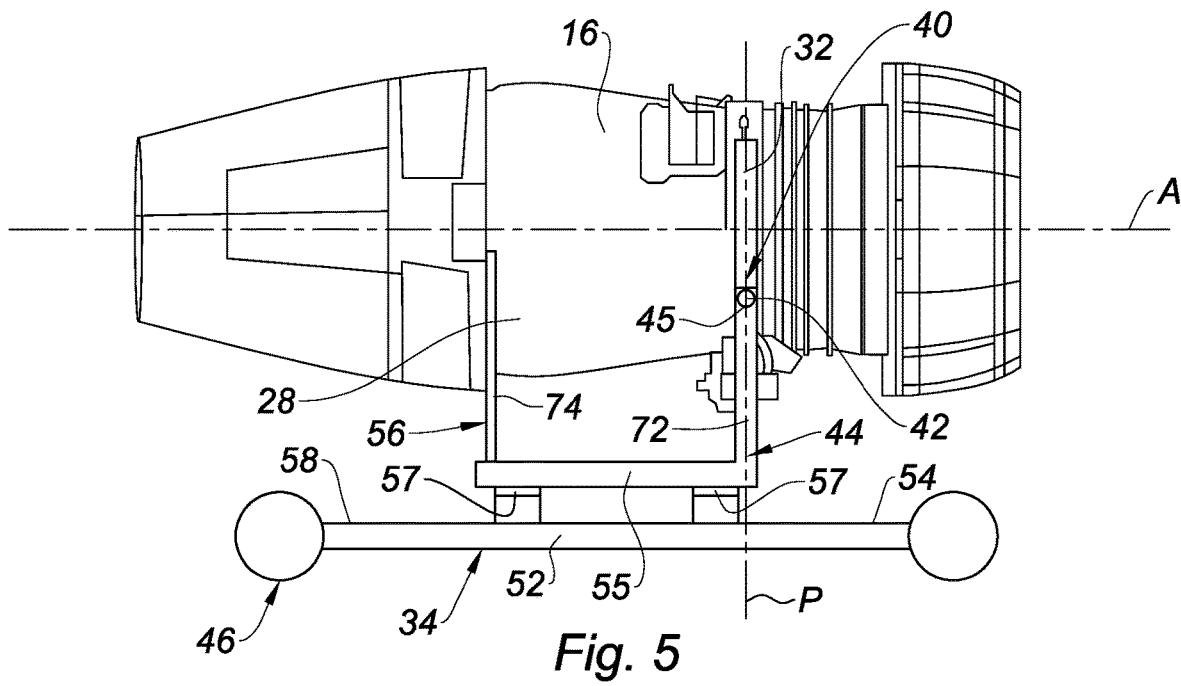

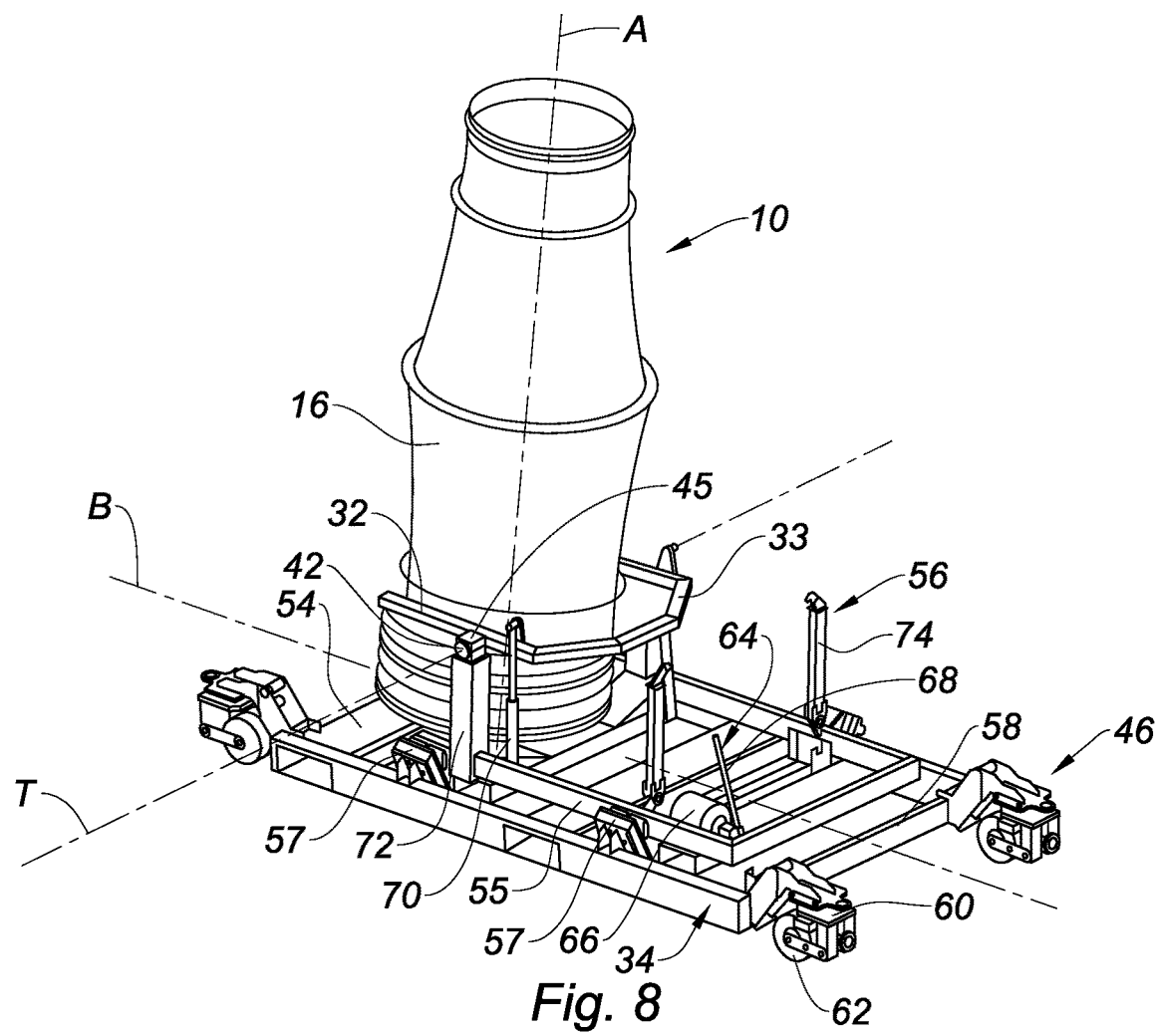
Fig. 8
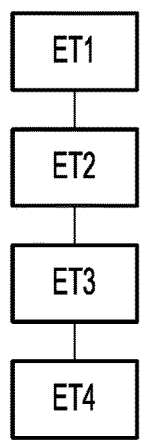
Fig. 9
Fig. 10
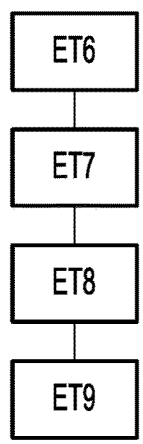
Fig. 11

ASSEMBLY FOR THE REMOVAL, TRANSPORTATION, AND MAINTENANCE OF A TURBINE ENGINE

TECHNICAL FIELD OF THE INVENTION

The present invention relates to the attachment of power plants to aircraft. More specifically, it relates to an assembly for supporting an aircraft turbine engine after lowering and removal of said turbine engine, comprising a member, a removal kit, and a maintenance trolley for performing said removal. The invention also relates to a method for removing a turbine engine from an aircraft, to a method for immobilising and transporting said turbine engine after its removal, and to a method for maintenance of said turbine engine in a vertical position after it has been removed and/or after it has been transported.

PRIOR ART

When work has to be performed on a turbine engine, it is necessary to remove it from the aircraft in which it is mounted before considering any maintenance operation.

A trolley is known that is able to receive a turbine engine before its removal from the aircraft, and to accompany it after its removal, as described in FR-1.526.221-A.

As a variant, a removal trolley is known that allows a turbine engine to be removed and received thereon once it has been removed.

In most cases, the turbine engine is initially mounted in the aircraft in a substantially horizontal position, and it is received substantially horizontally on the trolley. A configuration of this kind is known for example from U.S. Pat. No. 6,292,999-B1, EP-0.038.227-A1, and U.S. Pat. No. 2,825,477-A.

It may also be the case that the turbine engine is mounted vertically in the aircraft, and in this case the turbine engine is received substantially vertically on the removal trolley, then tilted on said trolley as described, for example, in FR-1.467.339-A. For this purpose, the turbine engine is mounted beforehand in a frame that is then received pivotably on the removal trolley. This frame is particularly bulky. In addition, the trolley is not intended to keep the turbine engine in a vertical position, this position being only a temporary position intended for receiving the turbine engine before it is finally placed in a horizontal position.

The removal trolleys known from the prior art are essentially used to transport the turbine engine a short distance from the aircraft to a maintenance workshop dedicated to maintenance operations, or from the aircraft to another trolley, specifically dedicated to long-distance transportation, for transporting it by air or by road.

The removal trolleys known from the prior art, which ensure the stability of the turbine engine in a horizontal position only, do not in any case allow very complex maintenance operations to be planned, but at best they can allow minor operations to be performed in a horizontal position, such as the replacement of peripheral accessories of the turbine engine. This type of removal trolley does not in any case allow work to be performed on the actual structure of the turbine engine, and in particular it does not allow modular elements of the turbine engine to be replaced, as this type of operation requires the turbine engine to be positioned vertically.

In fact, by its construction, a turbine engine is produced in the form of an assembly of modules, for example a fan module, compressor modules, a combustion chamber module, and turbine modules. At least the compressor and turbine modules include a rotor element that is received in a stator element or housing element that is provided with the rotor element. When a compressor module or turbine module of the turbine engine has to be replaced, the compressor or turbine rotor(s) and the stators or housings associated therewith are therefore replaced at the same time.

Such a replacement of this kind can therefore be performed only with the turbine engine in a vertical position. Consequently, it cannot be performed on the trolley used to remove the turbine engine, because said trolley provides stability for the turbine engine in a horizontal position only. Indeed removal trolleys that allow a turbine engine to be received vertically are not intended to ensure that it is kept in this position, and do not provide sufficient stability for the turbine engine to allow maintenance of same to be considered.

FR-2.952.922-A1 discloses a handling assembly allowing a turbine engine to tilt between a horizontal position and a vertical position in order to facilitate its assembly by modules when they are removed from their crates. A handling assembly of this kind is not movable because it is reserved for an assembly operation in a workshop. Consequently, it cannot be conveyed to an aircraft.

Devices for suspension in a vertical position, such as that described in FR-2.990.190-A1, are also known.

Furthermore, whether it is removal trolleys or handling assemblies known from the prior art that are concerned, none of these devices is intended to be placed on board a vehicle, whether this be a road vehicle or an aircraft, because they do not offer clamping of the turbine engine that is sufficient for it to be transported.

There is therefore a need for a trolley that allows the turbine engine to be removed, and/or complex maintenance operations to be performed with said turbine engine in a vertical position, and/or the turbine engine to be transported by road or air in a stable manner.

This need is particularly acute in regions that do not have dedicated maintenance workshops close to the runways, and where a replacement turbine engine is not always offered in the event of a failure.

A conventional turbine engine 10 comprises different types of special fasteners, as shown in FIG. 1.

In a known manner, in its upper portion 12, the turbine engine 10, with longitudinal axis A, usually comprises upper means 14 for attaching a housing 16 of the turbine engine to the aircraft, which are arranged on either side of the turbine engine 10. Said upper attachment means 14 allow the turbine engine 10 to be suspended from a strut (not shown) attached beneath the wing of the aircraft. Said upper attachment means 14 cannot be used on their own to support the total weight of the turbine engine 10 in a vertical position.

In a lower portion 18, the turbine engine 10 comprises, usually, first lower means 20 dedicated to transportation for attaching the housing 16 of the turbine engine, which are arranged in an upstream portion 22 of the turbine engine 10 either side of the turbine engine 10. The upstream portion 22 is a portion close to a fan 24 of the turbine engine 10.

In the lower portion 18, the turbine engine 10 also usually comprises second lower means 26 dedicated to transportation for attaching the housing 16 of the turbine engine 10, which are arranged in a downstream portion 28 of the turbine engine 10. Said downstream portion 28 is a portion close to an exhaust pipe 30 of the turbine engine 10. It will be understood that the terms "upstream" and "downstream" are defined with reference to the direction in which gases flow in the turbine engine 10.

The first and second lower attachment means 20, 26 are themselves also arranged either side of the housing 16 of the turbine engine 10. Said first and second lower attachment means 20, 26 cannot be used on their own to support the total weight of the turbine engine 10 in a vertical position.

PRESENTATION OF THE INVENTION

The invention takes advantage of the coexistence of the upper attachment means and the first and second lower attachment means, inherent in the turbine engine, to allow the turbine engine to be supported in a trolley meeting the needs stated above, said trolley allowing the removal of the turbine engine, the transportation of the turbine engine, and the performance of maintenance operations on the turbine engine in a vertical position, without requiring the turbine engine to be transferred to a trolley or a frame dedicated specifically to one of these uses only.

For this purpose, the invention proposes an assembly for supporting an aircraft turbine engine after lowering and removal of said turbine engine from an aircraft to which the turbine engine is attached, comprising a turbine engine provided with upper attachment means and lower attachment means, a support member engaging with said upper attachment means and said lower attachment means of the turbine engine, and a maintenance trolley capable of receiving the turbine engine provided with two support members.

With this aim in view, the invention proposes more specifically an assembly for supporting an aircraft turbine engine after said turbine engine has been lowered and removed from an aircraft to which the turbine engine is attached, said assembly comprising:
- a turbine engine with axis A of which a housing comprises an upper means for attaching the turbine engine to the aircraft and a first lower attachment means dedicated to transportation;
- a maintenance trolley; and
- a member for supporting said turbine engine on said maintenance trolley, said member being designed to be attached to said housing of the turbine engine and comprising at least one means for attaching said member to said housing, and at least one support and articulation means designed to allow the support of said member together with the turbine engine on said trolley and the pivoting of said member together with the turbine engine about a substantially horizontal axis between at least one position in which the axis is horizontal and one position in which the axis A is vertical;

characterised in that the member comprises a first attachment means designed to engage with the upper means for attaching the housing of the turbine engine to the aircraft, a second attachment means designed to engage with the first lower means dedicated to transportation for attaching the housing of the turbine engine, and the support and articulation means, which comprises a pivot means designed to engage with a complementary means for receiving said pivot means supported by the trolley.

According to another feature of this assembly, said assembly being considered in relation to the orientations, referred to as "inner" and "outer" orientations, whereby the inner orientation is an orientation turned towards the turbine engine and the inner orientation is an orientation turned away from the turbine engine, the member is in the form of a first arm, designed to be attached laterally to the turbine engine and to extend in a plane transverse to its axis A in an upstream portion of the housing of said turbine engine, opposite ends of said first arm comprising, on an inner side of the first arm, the first and second attachment means, respectively, and an intermediate portion of said first arm comprising, on the outer side of said first arm, a shaft forming the pivot means of the support and articulation means, said shaft being capable of engaging with a clevis of said trolley formed in the complementary receiving means of said trolley.

According to another feature of this assembly, said assembly comprises more specifically a kit for supporting an aircraft turbine engine with longitudinal axis A on a maintenance trolley that is substantially symmetrical along an orientation axis B and comprising a pair of receiving means that are opposed transversely relative to said axis B, characterised in that it comprises a pair of members of the type described above, said members being designed to be attached by their inner sides in a single plane transverse to the axis A either side of an upstream portion of the housing of the turbine engine and to engage complementarily by their outer sides with receiving means supported by the trolley.

According to another feature of this assembly, said assembly comprises a maintenance trolley for an aircraft turbine engine with longitudinal axis A, characterised in that it comprises a frame extending substantially symmetrically either side of an orientation axis B which comprises:
- a pair of receiving means, opposed transversely relative to said axis B, which are arranged substantially in proximity to a first longitudinal end of the trolley, and which are designed to receive, between their inner sides, a support kit of the type described above that is attached to the upstream portion of the housing of said turbine engine, and to engage with said support kit;
- a pair of clamping means, opposed transversely relative to said axis B, which are arranged substantially in proximity to a second longitudinal end of the trolley, and which are designed to receive, between their inner sides, a downstream portion of the housing of the turbine engine in the horizontal position of the axis of said turbine engine and to be attached thereto;
- means for rolling, attached beneath said frame;
- at least one independent means for tilting, which is designed to cause the support kit to tilt between the horizontal position and the vertical position of the turbine engine.

The trolley is designed to engage with members of the type described above, and each receiving means of the trolley comprises a substantially vertical second arm, a free end of which comprises the clevis for receiving the shaft of the pivot means of the first arm forming the corresponding member;

Each clamping means of the trolley comprises a substantially vertical third arm, a free end of which comprises a means for attachment to a second lower means dedicated to transportation for attaching the housing of the turbine engine, which lower means is arranged in a downstream portion of the turbine engine; and The independent means for tilting the trolley is designed to rotate at least one of the members about the pivot means.

Said members, kit, and trolley of the support assembly can be used in a method for removing an aircraft turbine engine, the removal being performed on the trolley of the type described above, by means of an assembly comprising a kit of members as described above. Said method is characterised in that it comprises at least:

a first step during which the turbine engine is supported relative to the aircraft and then detached from the aircraft;

a second step during which the two members from the kit are attached to the turbine engine housing;

a third step during which the trolley is positioned beneath the turbine engine so that the axis of the turbine engine and the axis of the trolley are arranged in a single vertical plane, and so that the shafts of the pivot means of the members are arranged at right angles to the clevises of the receiving means of the trolley;

a fourth step during which the turbine engine is lowered in relation to the trolley until the shafts of the pivot means of the members enter the clevises of the receiving means of the trolley, and until the second lower means dedicated to transportation for attaching the housing of the turbine engine comes into contact with the arm of the corresponding clamping means.

Said members, kit, and trolley of the support assembly can also be used in a method for immobilising/transporting an aircraft turbine engine in a horizontal position. Said method is characterised in that it is used at the end of a method for removal of the type described above and in that it comprises at least one step of locking during which the shafts of the pivot means are locked in the clevises and the second lower means for attaching the housing of the turbine engine is locked with the arm of the corresponding clamping means.

Lastly, said members, kit, and trolley of the support assembly can be used in a method for maintenance of an aircraft turbine engine in a vertical position.

Said method is characterised in that it is used at the end of a method for removing and/or a method for immobilising of the type described above, and in that it comprises at least:

a first step during which a fan is removed from the turbine engine;

a second step during which the second lower means for attaching the turbine engine housing is unlocked from the arm of the corresponding clamping means;

a third step during which the independent means for tilting is actuated to tilt the turbine engine from the horizontal position to the vertical position of its axis;

a fourth step during which at least one maintenance operation is performed with the turbine engine in a vertical position.

BRIEF DESCRIPTION OF THE FIGURES

The invention will be better understood and other details, features and advantages of the present invention will become clearer upon reading the description that follows, given as a non-limiting example and with reference to the accompanying drawings, in which:

FIG. 4 is a perspective view of the turbine engine received on the trolley in a horizontal position;

FIG. 5 is a side view of the turbine engine received on the trolley in a horizontal position;

FIG. 8 is a perspective view of the turbine engine received on the trolley from FIG. 7, the turbine engine occupying a vertical position;

FIG. 9 is a block diagram showing the steps of a method for removal according to the invention;

FIG. 10 is a block diagram showing the step of a method for immobilisation/transportation according to the invention; and FIG. 11 is a block diagram showing the steps of a method for maintenance in a vertical position according to the invention.

DETAILED DESCRIPTION

Figure 1:
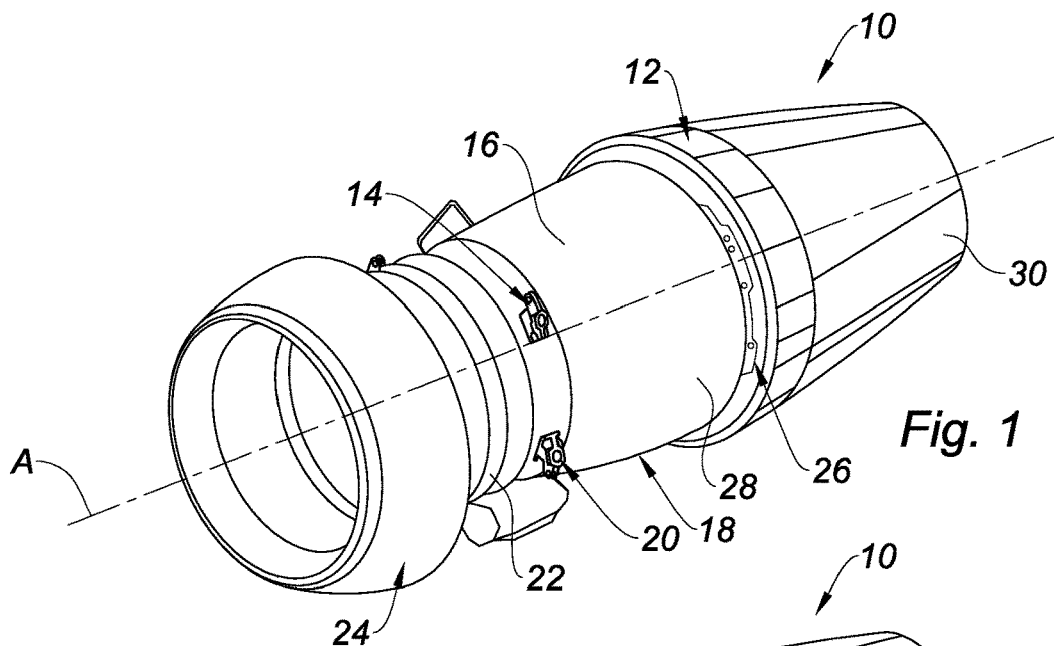
FIG. 1 (already described) is a perspective view of a turbine engine and of its upper and lower attachment means.

In the description that follows, identical reference signs designate parts that are identical or have similar functions.

FIG. 4 shows the different elements that constitute an assembly for supporting an aircraft turbine engine 10 after that said turbine engine 10 has been lowered and removed from an aircraft (not shown) to which the turbine engine 10 is attached. Said assembly comprises a turbine engine 10 having an axis A which comprises a housing 16 comprising an upper means 14 for attaching the turbine engine 10 to the aircraft and a first lower attachment means 20 dedicated to transportation, a maintenance trolley 34, and at least one member 32 for supporting said turbine engine 10 on said maintenance trolley 34.

Figure 2:
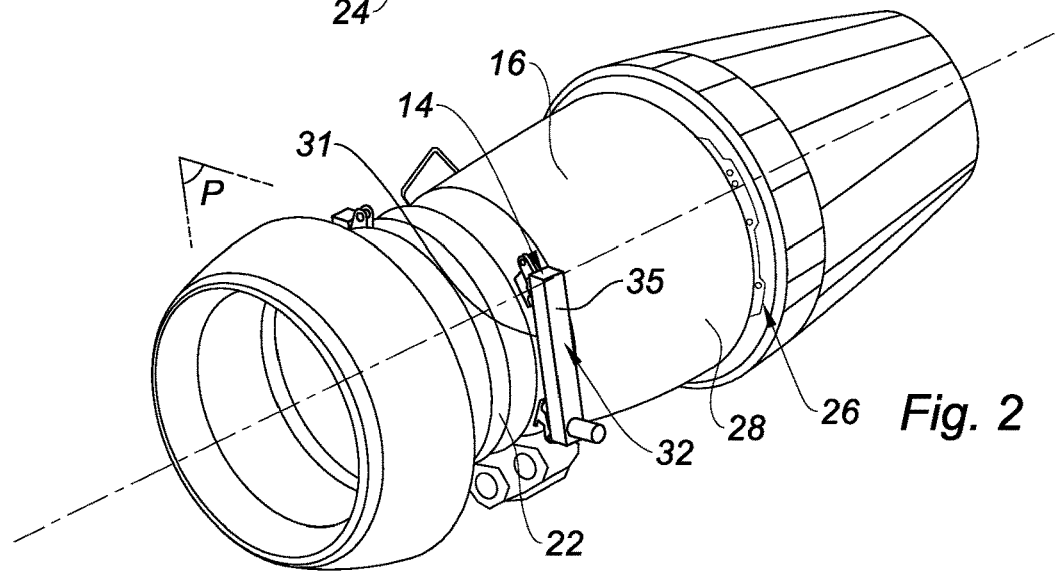
FIG. 2 is a perspective view of the turbine engine from FIG. 1 provided with a kit of members according to the invention.
Figure 3:
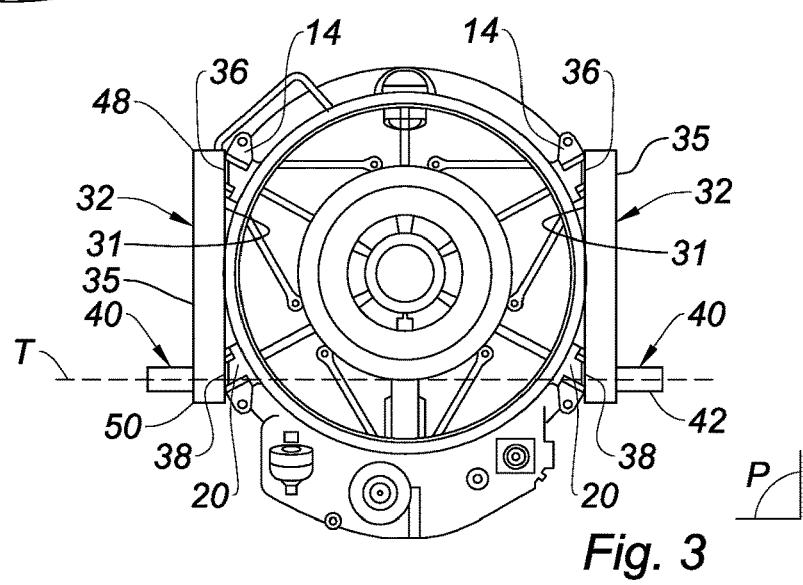
FIG. 3 is an end view of the turbine engine from FIG. 2 provided with its kit of members.

More specifically, FIGS. 2 and 3 show members 32 arranged either side of the turbine engine 10. Said members 32 are intended to support the turbine engine 10 on a maintenance trolley 34, of the type shown in FIG. 4 to 6, the turbine engine 10 having been removed and lowered beforehand from the aircraft to which it was attached. There are two members 32, and they therefore form a support kit for the assembly that can be fitted onto the turbine engine 10.

As shown in FIGS. 2 and 3, the members 32 are designed, generally, to be attached to the housing 16 of the turbine engine 10 and each member 32 comprises at least one means 36, 38 for attaching said member 32 to the housing 16 of the turbine engine, and at least one support and articulation means 40.

Figure 6:
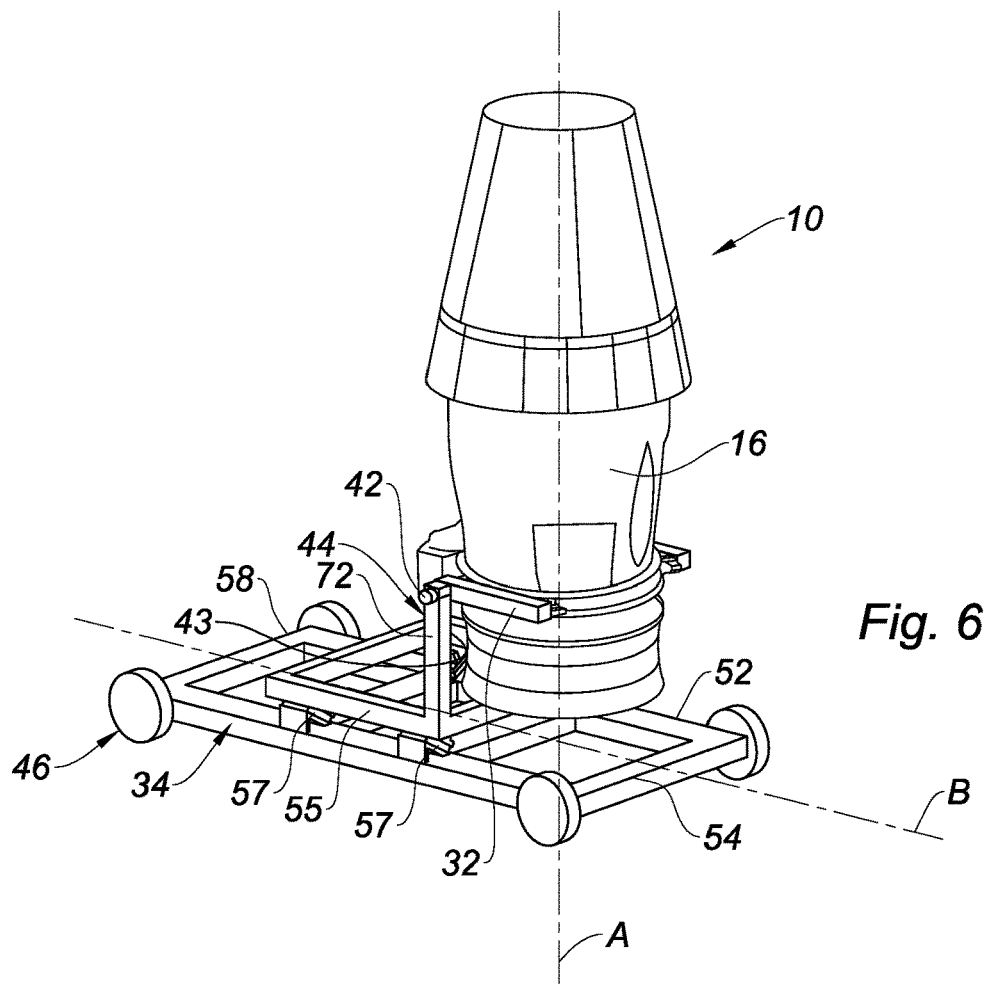
FIG. 6 is a perspective view of the turbine engine received on the trolley in a vertical position.

The support and articulation means 40 is designed, as shown in FIG. 4 to 6, to allow said member 32 and the turbine engine to which it is attached to be supported on the trolley 34, and to allow said member 32 together with the turbine engine 10 to pivot about a substantially horizontal axis T between at least one position in which the axis A of the turbine engine 10 is horizontal, as shown in FIGS. 4 and 5, and a position in which the axis A of the turbine engine 10 is vertical, as shown in FIG. 6.

According to the invention, each member 32 comprises a first attachment means 36 that is specifically designed to engage with the upper means 14 for attaching the housing 16 of the turbine engine 10 to the aircraft, and a second means 38 that is specifically designed to engage with the first lower attachment means 20 dedicated to transportation for attaching the housing 16 of the turbine engine 10. It will therefore be understood that the support assembly therefore comprises a turbine engine that specifically comprises an upper means 14 of this kind for attaching the housing 16 to the aircraft and a lower means 20 of this kind, dedicated to transportation, for attaching the housing 16 of the turbine engine 10.

FIG. 3 shows the attachment means 36, 38 of the member 32 in the form of simple surfaces of said member 32 which are turned towards the turbine engine 10 and which are in contact with the upper attachment means 14 and the first lower attachment means 20, respectively. In particular, the detail of the attachment of the attachment means 36, 38 has not been shown and it will be understood that it can take any known form capable of providing a rigid connection. It will be understood that this arrangement does not limit the invention and that other interfaces between the turbine engine 10 and the arms 32 can be considered.

Each member 32 also comprises the support and articulation means 40, which more specifically comprises a pivot means 42 that is designed to engage with a complementary receiving means 44 supported by the trolley 34, as shown in FIG. 4 to 6.

More specifically, as shown in FIG. 3, each member 32 is in the form of a first arm 32, designed to be attached laterally to the turbine engine 10 by an inner side 31 of the first arm 32. The first arm 32 extends, as shown in FIG. 3 to 5, in a plane P which is transverse to the axis A of the turbine engine 10 and which is situated in the upstream portion 22 of the housing 16 of said turbine engine 10. Said plane P has been shown in FIGS. 3 and 5 in the position in which the axis A of the turbine engine 10 is horizontal.

Opposite ends 48, 50 of each first arm 32, relative to its general direction, comprise the first and second attachment means 36, 38, respectively, which, on the inner side 31 of the first arm 32, are turned towards the turbine engine 10 so as to engage with the upper attachment means 14 of the housing 16 and with the first lower attachment means 20 of the housing 16. Each first arm 32 further comprises, on an outer side 35 of the first arm 32 opposite the side 31, a shaft 42 forming the pivot means of the support and articulation means 40. Said shaft 42 is able to engage with a clevis 45 of said trolley 34 formed in the complementary receiving means 44 of said trolley 34.

The first and second attachment means 36, 38 can take any form known from the prior art, provided that they engage with the upper attachment means 14 of the housing 16 and with the first lower attachment means 20 of the housing 16. As the detail of producing this assembly is not the subject matter of the invention, it will not be described more explicitly in the next part of this description.

In their simplest expression, the arms 32 can be independent, as shown in FIG. 3 to 6. In a variant embodiment of the invention shown in FIGS. 7 and 8, the arms 32 can, conversely, form part of a substantially U-shaped frame 33, in which the turbine engine 10 is received.

This last configuration allows the stiffness of the assembly of the arms 32 and the turbine engine 10 to be improved.

Once the turbine engine 10 has been provided with an attachment kit comprising the two arms 32 attached by their inner sides 31 to the housing 16 of the turbine engine 10, it is received on the trolley 34. The trolley 34 comprises a frame 52, preferably produced as a fabricated construction, which extends substantially symmetrically either side of an orientation axis B, as shown in FIGS. 4, 6, 7, and 8. When the turbine engine 10 is lowered onto the trolley 34, it is ensured that the axis A of the turbine engine 10 and the axis B of the trolley 34 are superimposed in a single vertical plane, so as to substantially centre the turbine engine 10 relative to the trolley 34.

The frame 52 preferably comprises a stand 55 that is attached to the frame 52 by means of intermediate damping elements 57, which are for example made in the form of Silentbloc elastomer pads 57.

As shown in FIG. 4 to 6, the trolley 34 comprises a pair of receiving means 44, supported by the stand 55 and arranged transversely in relation to the axis B, and which are each intended to receive the shaft 42 forming the pivot means of the support and articulation means 40. The two receiving means 44 are intended to receive the support kit between their inner sides 43 and to engage with the two shafts 42 of the support kit, which are supported by the outer sides 35 of the arms 32. The receiving means 44 are preferably arranged substantially at one end of the stand 55, in proximity to a first longitudinal end 54 of the trolley 34.

The trolley 34 also comprises a pair of clamping means 56, transversely opposed in relation to the axis B, which are supported by the stand 55 and which are preferably arranged at the other end of the stand 55, substantially in proximity to a second longitudinal end 58 of the trolley 34, that is to say substantially opposite the pair of receiving means 44. The clamping means 56 are designed to receive, between their inner sides 59, the downstream portion 28 of the housing 16 of the turbine engine 10 in the horizontal position of the axis A of said turbine engine, and to be attached thereto.

Figure 7:
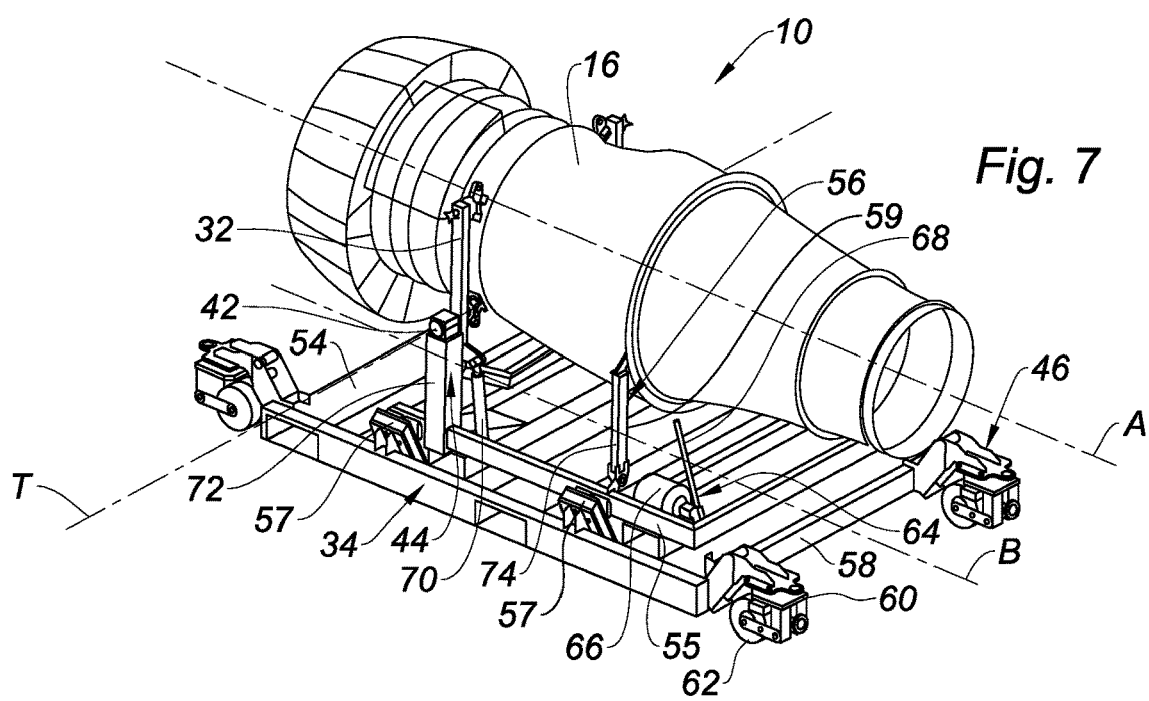
FIG. 7 is a perspective view of the turbine engine provided with members in a variant of the invention received in a horizontal position on a trolley in a variant of the invention.

The trolley 34 also comprises means for rolling 46 that are attached beneath the frame 52. In FIG. 4 to 6, said means for rolling 46 have been shown in their simplest expression in the form of wheels 46 disposed at the four corners of the frame 52. However, as shown in FIGS. 7 and 8, said means for rolling comprise plates 60, which are pivotally mounted at the four corners of the frame 52 and which receive rollers 62, as shown in FIGS. 7 and 8. This configuration allows the trolley 34 to be moved and guided in all directions. It will also be noted that, in a known manner, the plates 60 can be provided with means for locking the rollers 62, so as to immobilise the trolley 34 in a predetermined position.

Lastly, the trolley 34 comprises at least one independent means for tilting, which is designed to cause the support kit to tilt between the horizontal position and the vertical position of the axis A of the turbine engine 10. In FIG. 4 to 6, which show the general principle of operation of the trolley 34, said independent means is not shown. In FIGS. 7 and 8, the independent means for tilting 64 is shown in the form of a hydraulic pump 66, actuated by a lever 68, which is capable of supplying oil to an actuator 70 that is interposed between the stand 55 of the trolley 34 and one of the arms 32 of the frame 33. Thus, the independent means for tilting 64 is designed to rotate at least one of the members 32 about the pivot means 42, this being done to cause the turbine engine 10, driven by said first arm 32, to tilt.

It will be understood that this configuration does not limit the invention, and that the independent means 64 can take other forms known from the prior art provided that, for its usual operation, it does not require any kind of attached supply of electrical or hydraulic power. On the other hand, the independent means 64 could consist of an electric actuator powered by a rechargeable battery. For this reason, it is desirable that the independent means 64 can be used, for example, close to an aircraft at the end of a runway or in any other place devoid of means for recharging in the immediate vicinity.

The independent means 64 can, depending on its configuration, be sufficient to lock the turbine engine 10 in a vertical position. However, it is possible to provide a means for locking the turbine engine 10 in a vertical position.

Preferably, each receiving means 44 comprises a substantially vertical second arm 72, supported by the stand 55, a free end of which comprises the clevis 45 for receiving the shaft 42 of the pivot means 40 of the corresponding first arm 32.

Each clamping means 56 comprises a substantially vertical third arm 74, supported by the stand 55, a free end of which comprises a means for attachment (not shown) to one of the second lower attachment means 26 dedicated to transportation which is arranged in the downstream portion 28 of the turbine engine 10. As shown in FIG. 6, said third arm 74 can be in particular removable and/or retractable, to facilitate access to the turbine engine 10 when it is tilted with its axis A at the vertical, in order to allow an operator to work on said turbine engine 10 without risk of interfering with said third arm 74. It will be understood that the third arms 74 can therefore equally be removable or simply retractable.

In this configuration, the members 32, used in the form of a kit, and the trolley 34 can be used in various ways.

Using these elements, as shown in FIG. 9, it is firstly possible to remove an aircraft turbine engine 10 onto a trolley 34 by means of a kit of the type described above, proceeding in accordance with a first step ET1 during which, the turbine engine 10 being in place in the aircraft, the turbine is first supported and detached from the aircraft. Then, during a second step ET2, the two members 32 belonging to the kit are attached to the housing 16 of the turbine engine 10. After this, during a third step ET3, the trolley 34 is positioned transversely beneath the turbine engine 10 so that the axis A of the turbine engine 10 and the axis B of the trolley 34 are arranged in a single vertical plane. The trolley 34 is also positioned longitudinally so that the shafts 42 of the pivot means 40 of the members 32 are arranged at right angles to the clevises 45 of the receiving means 44 of the trolley 34. Then, during a fourth step ET4, the turbine engine 10 is lowered relative to the trolley 34 until the shafts 42 of the pivot means 40 of the members 32 enter the clevises 45 of the receiving means 44 of the trolley 34, and until the second lower means 26 dedicated to transportation for attaching the turbine engine housing comes into contact with the arm 74 of the corresponding clamping means 56.

In this configuration, the turbine engine 10 rests on the trolley 34 in a stable manner by means of gravity, as shown in FIG. 4 to 8.

If the turbine engine 10 is to be immobilised and/or transported in a horizontal position, as may be necessary for transportation by road or air, it is necessary to clamp the turbine engine 10 to the trolley 34 to ensure its stability.

For this purpose, as shown in FIG. 10, at the end of a method for removal of the type described above, at least one locking step ET5 is performed in order to immobilise or transport the turbine engine 10, during which, firstly, the shafts 42 forming the means for pivoting into the clevises 45 and, secondly, the second lower means 26 for attaching the turbine engine housing, are locked directly with the arm 74 of the corresponding clamping means 56. In this instance, the turbine engine 10 rests not only on the stand 55 of the trolley 34, but it is clamped thereto so that it cannot escape therefrom if it is subjected to a vertical acceleration that may be caused by a jolt, in a road transport context, or by an air pocket, in an air transport context.

A particularly advantageous feature of the invention is that, at the end of the removal of the turbine engine 10 and/or from said clamped position, it is possible to carry out maintenance work on the turbine engine 10 in a vertical position directly on the trolley 34, without it being necessary to transfer the turbine engine onto another trolley or onto another stand specially dedicated to this operation.

It is therefore possible to carry out maintenance of the turbine engine 10, after a simple removal operation, or after it has been clamped. As shown in FIG. 11, a method for maintenance according to the invention therefore comprises a first step ET6 during which the fan 24 of the turbine engine 10 is removed. The aim of this operation is to reduce the vertical dimensions of the turbine engine 10 once its axis A is in a vertical position. Then, during a second step ET7, each second lower means 26 for attaching the housing of the turbine engine is unlocked from the third arm 74 of the corresponding clamping means 56. Then, during a third step ET8, the independent means for tilting 64 is actuated in order to tilt the turbine engine from the horizontal position of its axis A to its vertical position, as shown in FIGS. 6 and 8. It will be noted that in this position it is possible, if the trolley 34 is provided with a means for locking the arms 32 in a vertical position, to lock the turbine engine 10 in this position.

Lastly, during a fourth step ET9, at least one maintenance operation is performed with the turbine engine 10 in a vertical position, for example the replacement of one or more modules of the turbine engine 10.

The invention therefore allows the equipment used as part of the operations to remove, transport and maintain a turbine engine 10 to be reduced significantly, and in particular it allows these pieces of equipment, brought together in a single piece in a less bulky manner than the devices known from the prior art, to be conveyed close to the aircraft on which maintenance has to be performed.

The invention claimed is:

1. Assembly for supporting an aircraft turbine engine after lowering and removal of said turbine engine from an aircraft to which the turbine engine is attached, said assembly comprising:
   a turbine engine with axis of which a housing comprises an upper means for attaching the turbine engine (10) to the aircraft and a first lower attachment means dedicated to transportation;
   a maintenance trolley; and
   a member for supporting said turbine engine on said maintenance trolley, said member being designed to be attached to said housing of the turbine engine and comprising at least one means for attaching said member to said housing, and at least one support and articulation means designed to allow said member together with the turbine engine to be supported on said trolley and to allow said member together with the turbine engine to pivot about a substantially horizontal axis between at least one position in which the axis is horizontal and a position in which the axis is vertical;
   wherein the member comprises a first attachment means designed to engage with the upper means for attaching the housing of the turbine engine to the aircraft, a second attachment means designed to engage with the first lower means dedicated to transportation for attaching the housing of the turbine engine, and the support and articulation means, which comprises a pivot means designed to engage with a complementary means for receiving said pivot means supported by the trolley.

2. Assembly according to claim 1, wherein the member is in the form of a first arm, designed to be attached laterally to the turbine engine and to extend in a plane transverse to its axis in an upstream portion of the housing of said turbine engine, opposite ends of said first arm comprising, on an inner side of said first arm, the first and second attachment means, respectively, said first arm comprising, on an outer side of said first arm opposite the inner side, a shaft forming the pivot means of the support and articulation means, said shaft being capable of engaging with a clevis of said trolley formed in the complementary receiving means of said trolley.

3. Assembly according to claim 2, wherein it comprises a kit for supporting the turbine engine on the maintenance trolley, said trolley being substantially symmetrical along an orientation axis and comprising a pair of receiving means that are opposed transversely relative to said axis, said kit comprising a pair of members, said members being designed to be attached by their inner sides in a single plane transverse to the axis either side of an upstream portion of the housing of the turbine engine and to engage complementarily by their outer sides with the receiving means supported by the trolley.

4. Assembly according to claim 3, wherein the trolley comprises a frame extending substantially symmetrically either side of the orientation axis and in that it comprises:
 a pair of receiving means, opposed transversely relative to said axis, which are arranged substantially in proximity to a first longitudinal end of the trolley, and which are designed to receive, between their inner sides, the support kit attached to the upstream portion of the housing of said turbine engine, and to engage with said support kit;
 a pair of clamping means, opposed transversely relative to said axis, which are arranged substantially in proximity to a second longitudinal end of the trolley, and which are designed to receive, between their inner sides, a downstream portion of the housing of the turbine engine in the horizontal position of the axis of said turbine engine, and to be attached thereto;
 means for rolling, attached beneath said frame;
 at least one independent means for tilting, which is designed to cause the support kit to tilt between the horizontal position and the vertical position of the axis of the turbine engine.

5. Assembly according to claim 4, wherein each receiving means of the trolley comprises a substantially vertical second arm, a free end of which comprises the clevis for receiving the shaft forming the pivot means of the corresponding first arm.

6. Assembly according to claim 4, wherein each clamping means of the trolley comprises a substantially vertical third arm, a free end of which comprises a means for attachment to a second lower means dedicated to transportation for attaching the housing of the turbine engine, which lower means is arranged in a downstream portion of the turbine engine.

7. Assembly according to claim 4, wherein the independent means for tilting the trolley is designed to rotate at least one of the members about the pivot means.

8. Method for removing an aircraft turbine engine onto a trolley according to claim 6, by means of an assembly for supporting an aircraft turbine engine after lowering and removal of said turbine engine from an aircraft to which the turbine engine is attached, said assembly comprising:
 a turbine engine with axis of which a housing comprises an upper means for attaching the turbine engine to the aircraft and a first lower attachment means dedicated to transportation;
 a maintenance trolley; and
 a member for supporting said turbine engine on said maintenance trolley, said member being designed to be attached to said housing of the turbine engine and comprising at least one means for attaching said member to said housing, and at least one support and articulation means designed to allow said member together with the turbine engine to be supported on said trolley and to allow said member together with the turbine engine to pivot about a substantially horizontal axis between at least one position in which the axis is horizontal and a position in which the axis is vertical;
 wherein the member comprises a first attachment means designed to engage with the upper means for attaching the housing of the turbine engine to the aircraft, a second attachment means designed to engage with the first lower means dedicated to transportation for attaching the housing of the turbine engine, and the support and articulation means, which comprises a pivot means designed to engage with a complementary means for receiving said pivot means supported by the trolley, wherein the member is in the form of a first arm, designed to be attached laterally to the turbine engine and to extend in a plane transverse to its axis in an upstream portion of the housing of said turbine engine, opposite ends of said first arm comprising, on an inner side of said first arm, the first and second attachment means, respectively, said first arm comprising, on an outer side of said first arm opposite the inner side, a shaft forming the pivot means of the support and articulation means, said shaft being capable of engaging with a clevis of said trolley formed in the complementary receiving means of said trolley, wherein said assembly comprises a kit for supporting the turbine engine on the maintenance trolley, said trolley being substantially symmetrical along an orientation axis and comprising a pair of receiving means that are opposed transversely relative to said axis, said kit comprising a pair of members, said members being designed to be attached by their inner sides in a single plane transverse to the axis either side of an upstream portion of the housing of the turbine engine and to engage complementarily by their outer sides with the receiving means supported by the trolley, wherein said method comprises at least:
 a first step during which the turbine engine is supported relative to the aircraft and then detached from the aircraft;
 a second step during which the two first arms forming the members of the kit are attached to the housing of the turbine engine;
 a third step during which the trolley is positioned beneath the turbine engine so that the axis of the turbine engine and the axis of the trolley are arranged in a single vertical plane, and so that the shafts of the pivot means of the members are arranged at right angles to the clevises of the second arms of the receiving means of the trolley;
 a fourth step during which the turbine engine is lowered in relation to the trolley until the shafts of the pivot means of the members enter the clevises of the receiving means of the trolley, and until the second lower means dedicated to transportation for attaching the housing of the turbine engine comes into contact with the third arm of the corresponding clamping means.

9. Method for immobilising/transporting an aircraft turbine engine in a horizontal position, wherein it is used at the end of a method for removal according to claim 8 and in that it comprises at least one step of locking during which the shafts of the pivot means are locked in the clevises of the second arms and the second lower means for attaching the housing of the turbine engine is locked with the third arm of the corresponding clamping means.

10. Method for maintenance of an aircraft turbine engine in a vertical position, wherein it is used at the end of a method for immobilisation according to claim 9, and in that it comprises at least:
- a first step during which, the turbine engine resting on the trolley, the fan is removed from the turbine engine;
- a second step during which the second lower means for attaching the housing of the turbine engine is unlocked from the arm of the corresponding clamping means;
- a third step during which the independent means for tilting is actuated to tilt the turbine engine from the horizontal position to the vertical position of its axis;
- a fourth step during which at least one maintenance operation is performed with the turbine engine in a vertical position.

11. Method for maintenance of an aircraft turbine engine in a vertical position, wherein it is used at the end of a method for removal according to claim 8, and in that it comprises at least:
- a first step during which, the turbine engine resting on the trolley, the fan is removed from the turbine engine;
- a second step during which the second lower means for attaching the housing of the turbine engine is unlocked from the arm of the corresponding clamping means;
- a third step during which the independent means for tilting is actuated to tilt the turbine engine from the horizontal position to the vertical position of its axis.

* * * * *